(12) United States Patent
Hatfield

(10) Patent No.: US 7,219,488 B2
(45) Date of Patent: May 22, 2007

(54) MOUNTING APPARATUS FOR STRING TRIMMER FOR AND WITH LAWN MOWER MULTI-TASK UNIT

(76) Inventor: Charles Hatfield, 624 Virginia Ave., Holly Hill, FL (US) 32117

( * ) Notice: Subject to any disclaimer, the term of this patent is extended or adjusted under 35 U.S.C. 154(b) by 52 days.

(21) Appl. No.: 11/230,189

(22) Filed: Sep. 19, 2005

(65) Prior Publication Data

US 2006/0021314 A1    Feb. 2, 2006

Related U.S. Application Data

(63) Continuation-in-part of application No. 10/779,035, filed on Feb. 13, 2004, now abandoned.

(51) Int. Cl.
*A01D 34/00* (2006.01)
(52) U.S. Cl. .................. 56/13.6; 56/12.7; 56/DIG. 9
(58) Field of Classification Search ............. 56/12.7, 56/13.6, 14.7, 15.8, DIG. 9; 30/276
See application file for complete search history.

(56) References Cited

U.S. PATENT DOCUMENTS

| | | | |
|---|---|---|---|
| 4,242,855 A | 1/1981 | Beaver, Jr. | |
| 4,688,376 A | 8/1987 | Wolfe, Sr. | |
| D304,728 S | 11/1989 | Piorkowski | |
| 4,894,916 A | 1/1990 | Nimz et al. | |
| 4,896,488 A | 1/1990 | Duncan et al. | |
| 4,936,886 A | 6/1990 | Quillen | |
| 4,965,990 A | 10/1990 | Slawson, Sr. et al. | |
| 5,040,360 A | 8/1991 | Meehleder | |
| 5,048,276 A | 9/1991 | Miller | |
| 5,226,284 A | 7/1993 | Meehleder | |
| 5,317,807 A | 6/1994 | Pulley | |
| 5,450,715 A | 9/1995 | Murray | |
| 5,477,665 A | 12/1995 | Stout | |
| 5,497,606 A | 3/1996 | Baxter | |
| 5,577,374 A | 11/1996 | Huston | |
| 5,598,689 A | 2/1997 | Bork | |
| 5,701,728 A | 12/1997 | Koka et al. | |
| 5,802,824 A | 9/1998 | Aldrich | |
| 5,809,758 A | 9/1998 | Flanigan et al. | |
| 5,933,966 A | 8/1999 | Yates et al. | |
| 6,032,443 A | 3/2000 | Aldrich | |
| 6,094,896 A | 8/2000 | Lane | |
| 6,397,572 B1 | 6/2002 | Roundy et al. | |
| 6,415,585 B2 | 7/2002 | Morabit et al. | |
| 6,430,906 B1 | 8/2002 | Eddy | |
| 6,474,053 B1 | 11/2002 | Lund | |
| 6,487,838 B2 | 12/2002 | Handlin | |
| 6,546,706 B1 | 4/2003 | Nafziger | |
| 6,745,549 B1 | 6/2004 | Taylor | |
| 2002/0129588 A1 | 9/2002 | Handlin | |
| 2003/0070407 A1 | 4/2003 | McDonner et al. | |

*Primary Examiner*—Thomas B. Will
*Assistant Examiner*—M. T. Nguyen

(57) ABSTRACT

A mounting apparatus is provided that attaches a string trimmer to a lawn mower. The mounting apparatus comprises components that provide for mechanical absorption of impacts to a head of the string trimmer. In one embodiment, the mounting apparatus comprises a lower mounting shock assembly comprising two vertically positioned springs or other suspension/shock absorbing devices, an upper impact assembly, comprising an angled spring, or other suspension/shock absorbing device, through which a shaft of the string trimmer passes, and components that provide for rotation of the string trimmer head with a drive motor provided with a protective clutch mechanism. Embodiments include providing the mounting apparatus on a lawn mower with a string trimmer device inserted therethrough.

20 Claims, 12 Drawing Sheets

Impact position

MOUNTING APPARATUS FOR STRING TRIMMER FOR AND WITH LAWN MOWER MULTI-TASK UNIT

This application is a continuation-in-part of U.S. Ser. No. 10/779,035, filed Feb. 13, 2004 now abandoned, the disclosure of which is incorporated herein by reference in its entirety.

BACK GROUND OF INVENTION

The present invention relates to lawn care equipment usually required by the grass cutting industry. Generally this scope of work begins with mowing open bodies of vegetation matter with a lawn mower, the lawn mower comprising a cutting deck that is maneuvered by handlebars or a steering wheel. This inital process usually leaves an unfinished appearance around the perimeters and around encompassed stationary objects, such as trees, gazebos, or other structures, that typically is addressed by use of a manually carried string trimmer. When performed in individual intervals such use of the manually carried string trimmer usually results in fatigue. Thus, a problem to be solved is how to more easily, and more efficiently, trim grass around perimeters and structures while generally mowing expanses of grass with a lawn mower.

Previous approaches to solving this problem, such as by multi tasking the lawn cutting and trimming process, are known. One approach is described in U.S. Pat. No. 4,949,536 granted to George Neufeld on Aug. 21, 1990, which teaches a lawn trimmer apparatus with means for mounting to the lawn mower body portion. Another approach is described is U.S. Pat. No. 6,487,838 B2, issued to Terry L. Handlin on Dec. 3, 2002. This patent discloses a mowing machine with a mounted hydraulic motor coupled to a string trimmer. Additional approaches are disclosed in U.S. Pat. No. 6,397,572 B1, issued to Chad Roundy on Jun. 4, 2002, in U.S. Pat. No. 6,094,896 issued to Edward J. Lane on Aug. 1, 2000, in U.S. Pat. No. 5,802,824, issued Sep. 8, 1998 to Steven H. Aldrich, and in U.S. Patent Publication No. U.S. 2004/0237491 A1, published Dec. 2, 2004, with inventors Brent Heighton and Kenneth Abbott. These and all other patents, patent applications, patent publications, and other publications referenced herein are hereby incorporated by reference in this application in order to more fully describe the state of the art to which the present invention pertains, to provide such teachings as are generally known to those skilled in the art.

While the foregoing references deal with the subject of mowing and/or trimming grass, they are highly customized in their operating parts. Accordingly, they are not useful with a commercially available trimmer that can be purchased at local retail and lawn care stores, such as those utilizing a small internal combustion engine. Also, the above approaches suffer from being not readily adaptable to a wide range of existing lawn mowers, nor being readily adaptable to a wide range of new lawn mowers without requiring a complete trimmer system apparatus specific and customized to the lawn mower to be utilized. By providing for use of existing "off the shelf" available trimmers, embodiments of the present invention consequently depart from the approaches of the prior art in providing in conjunction with such available trimmers an efficient and effective mounting apparatus to trim grass and vegetation. Also, these and other embodiments of the present invention may be provided on new lawn mowers with or without a provided trimmer, to provide for more lawn mower devices that are more readily able to provide a trimming function.

DETAILED DESCRIPTION OF EMBODIMENTS OF THE INVENTION

The present invention advances the art of multi-task lawn devices, particularly those that comprise lawn mowing and lawn trimming capabilities. Embodiments of the mounting apparatus of the present invention provide for mounting on a lawn mower a string trimmer that thereby is readily adjustable with regard to cutting angle and height, and in which the trimmer, due to impact-absorbing features of the mounting apparatus, is able to withstand reasonable impacts from all directions without sustaining damage to the trimmer or to the mounting apparatus. In various embodiments, the impact-absorbing mounting apparatus provides for adjustment of trimmer head height, and given the variety of commercially available trimmers and their interchangeable heads, provides for attachment of such trimmers to a wide range of lawn mowers. Such embodiments may thereby eliminate a need for dedicated and specialized trimmer devices requiring custom-made parts for particular lawn mower models or styles.

Generally, the solution to the problem of effectively combining a trimming function with a lawn mower is achieved by attaching a string trimmer to a lawn mower frame with an impact-absorbing mounting apparatus of the present invention that comprises desired features. Such mounting apparatus comprises impact-absorbing features about a shaft of the string trimmer, and also comprises a control lever device that adjusts the string trimmer head's rotational position. In various embodiments, a motor powering such rotation is protected by a slip friction junction which acts as a clutch-like feature to reduce the possibility of damage to the motor from rotational impacts or while using the control lever device to place the trimmer in a preferred trimming angle. Other impact-absorbing features are provided that reduce the chance of damage to the trimmer when impacts are received from other angles.

After examination of the disclosure herein, it will become clear that the embodiments of the present invention solve problems associated with directional impacts upon a string trimmer head when mounted upon a lawn mower. These problems are solved by providing a number of impact-absorbing features with various directional impact resistant capabilities to protect the trimmer during operation in combination with the apparatus. Prior art approaches have not addressed all of the various directional impacts, and thus the present invention is more effective at providing a useful and readily usable trimmer apparatus on a lawn mower, to transform the lawn mower into a multi-task lawn device by adding a trimmer function to a standard lawn mower's cutting capabilities.

Figure 1A:
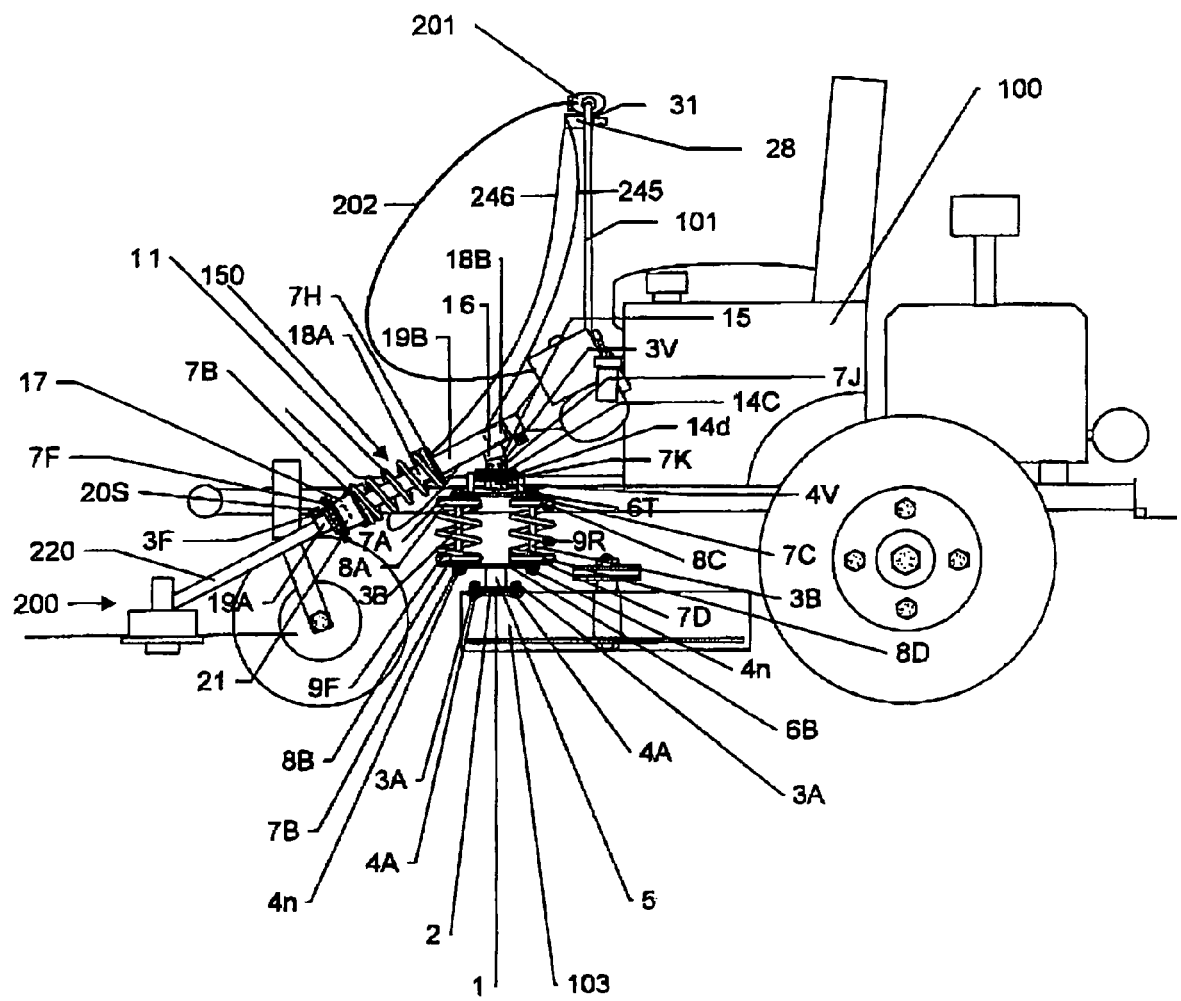
FIG. 1A provides a side plan view depicting one embodiment of the present invention integrating an operatively positioned string trimmer mounted on a lawn mower maneuvered by handlebars.
Figure 1B:
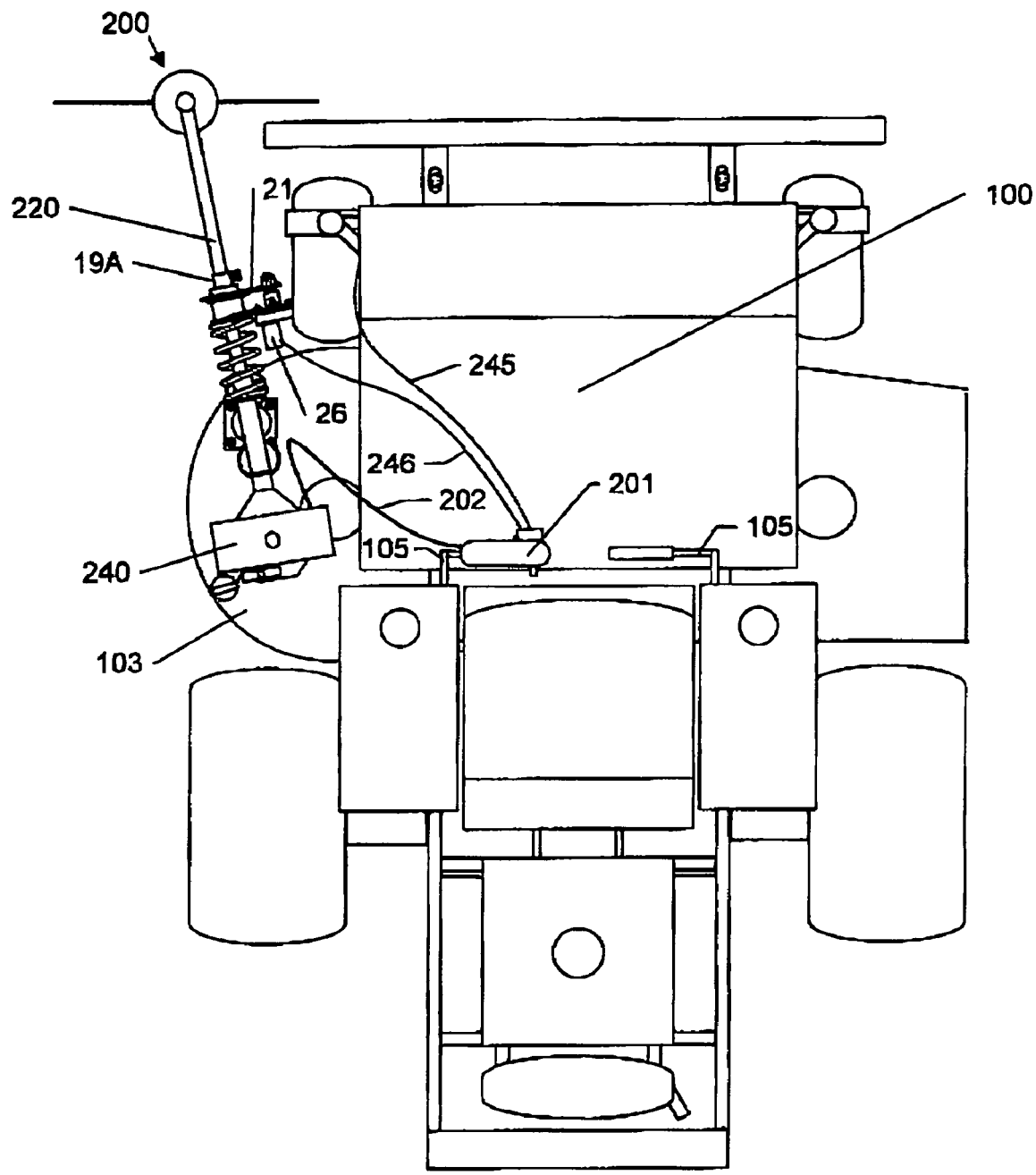
FIG. 1B provides a top plan view of the embodiment depicted in FIG. 1A.
Figure 1C:
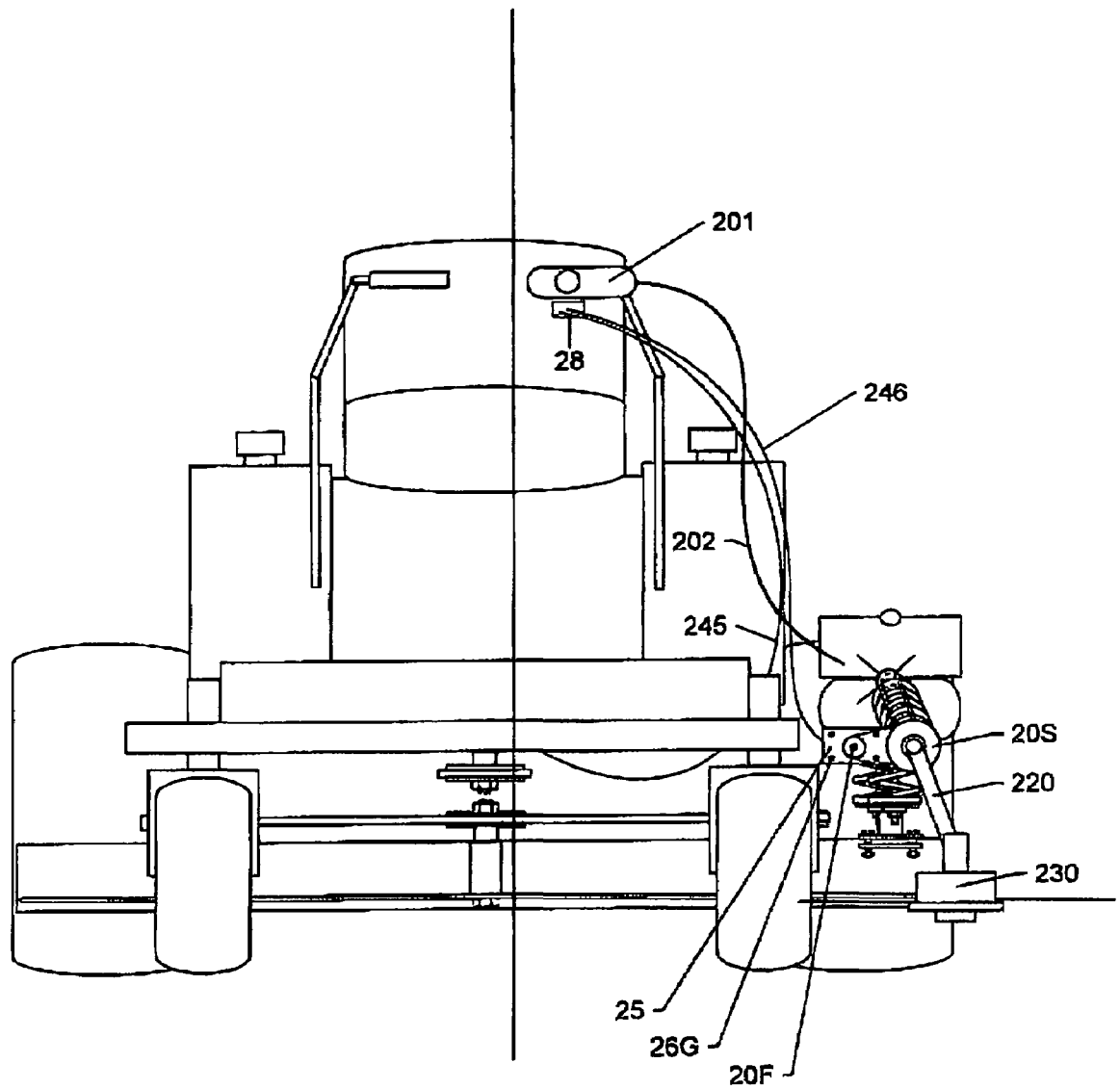
FIG. 1C provides a full front view of the embodiment of FIGS. 1A and 1B showing the present invention integrating the operatively positioned string trimmer mounted on a lawn mower.
Figure 3A:
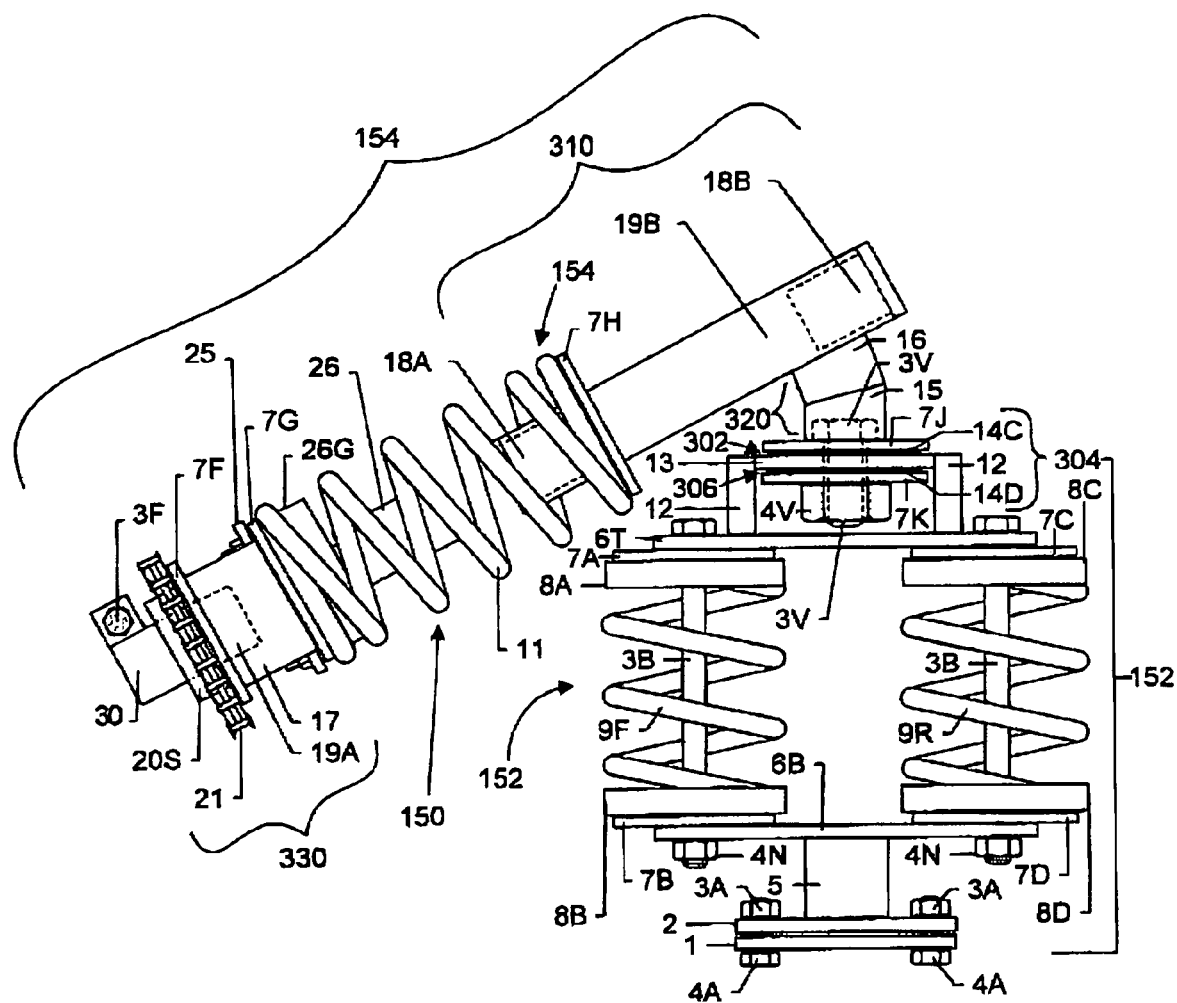
FIG. 3A depicts an enlarged side view of the embodiment of the apparatus shown in FIGS. 1A-1C, not mounted on a lawn mower.

Now with reference to the drawings illustrating certain embodiments of the invention, as shown in FIGS. 1A-1C is one embodiment of a mounting apparatus 150 of the present invention. While the components of mounting apparatus 150 are described below with reference to FIGS. 1A-C, the same embodiment of that mounting apparatus 150 also is described with reference FIGS. 3A and 3B, to further describe certain relationships and alternatives. Generally, a mounting apparatus 150 may be considered to comprise three assemblies or sub-combinations that function in concert. As can be seen in FIG. 3A the mounting apparatus 150 comprises a lower mounting shock assembly 152 that, inter alia, provides for attachment of the mounting apparatus 150 to a lawn mower (such as lawn mower 100 in FIG. 1A), a upper impact assembly 154 that provides for shaft rotation and for compression upon certain impacts, and a head angle adjustment sub-combination (components discussed below and with reference to FIG. 3B) that provides for the shaft rotation adjustments to effectuate rotation of the trimmer head held by mounting apparatus 150.

As may be viewed in FIGS. 1A-C, a string trimmer 200 is mounted on a lawn mower 100 by mounting apparatus 150. The string trimmer 200 comprises an elongated tubular drive shaft housing 220 having opposite front and rear end ends, a string trimmer head 230 attached to the front end, and a power source 240 located at the rear end portion, with a drive conduction mechanism (not shown, within housing 220) connecting the power source 240 to the string trimmer head 230. A control handle 201 of the string trimmer 200 is conveniently positioned near a driving handle 105 of lawn mower 100, where the driving handle 105 is conveniently disposed near the upper end of a vertically disposed handlebar 101, near where an operator of the lawn mower 100 could control with ease. The control handle 201, which may be the original control device of the string trimmer 200, separated and so repositioned, communicates through a control conduit 202 (electrical or mechanical) to the string trimmer power source 240.

Further as viewable in FIG. 1A, a mounting apparatus 150 of the string trimmer may have the following arrangement of components. A mounting post 5 may be attached to any appropriately supportive structure of the lawn mower 100. Further to the mounting post 5, in operational position this is joined by an outer mounting bracket 2 onto a cutting deck 103 of the lawn mower 100. As shown in FIG. 1A, the mounting post 5 is secured to cutting deck 103 by connecting the outer mounting bracket 2 with an inner mounting bracket 1 by fasteners comprising paired nuts 3a and bolts 4a. The mounting post 5 is affixed to a bottom mounting bracket 6B upon which rest two helical springs, a front spring 9f located more forward and a rear spring 9r located more rearward. Each such spring 9f and 9r has positioned at its respective top and bottom ends a spring retainer 8A-D, each of which has positioned to its exterior side a flat washer 7A-D (Also see FIG. 3A). In contact with the top-positioned flat washers 7A and 7C is a top mounting bracket 6T, and bottom flat washers 7B and 7D are positioned to contact bottom mounting brackets 6B. Any of a number of known adjustable fasteners may be provided to connect the bottom 6B and top 6T mounting brackets so as to provide an adjustable compression of the front 9f and rear 9r springs. More generally, for any fastener described herein, any suitable fastener known to those skilled in the art may be utilized instead of the fastener shown. For example, any fastener means may be utilized, where that fastener means is a means for fastening that includes a rivet, a matched nut and bolt, a screw, and a bolt or other shaft with cotter pin, key, spring clip, or other clip.

Figure 8:
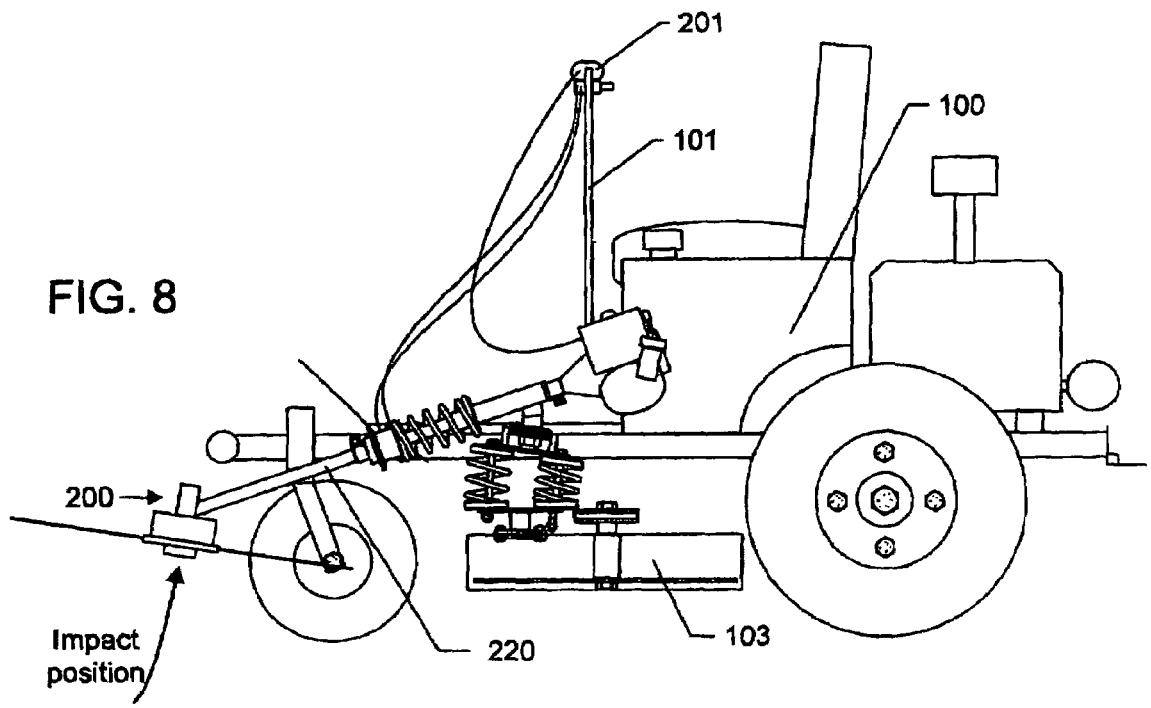
FIG. 8 provides a side plan elevation view showing the present invention integrating the upward impact position from below the trimmer head on the string trimmer mounted on a lawn mower cutting deck.
Figure 9:
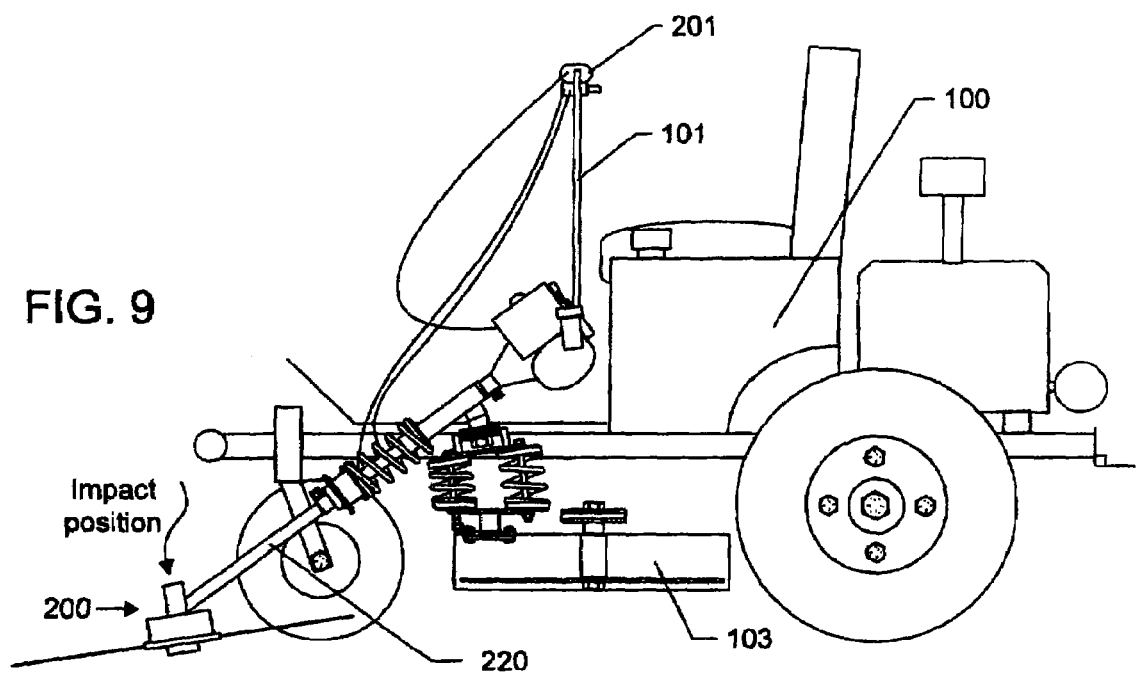
FIG. 9 provides a side plan elevation view showing the present invention integrating the downward impact position from above the trimmer head on the string trimmer mounted on a lawn mower cutting deck.

As shown in FIG. 1A, a fastener for each such spring 9f and 9r comprises a fastener bolt 3b, respectively passing centrally through the front spring 9f and rear spring 9r, as well as through holes (not shown) in each of the top and bottom mounting brackets 6T and 6B, and a fastener nut 4n. Upon fastening of each fastener bolt 3b with the corresponding fastener nut 4n, the two springs 9f and 9r, each so secured, may be adjusted to a desired vertical span relative to one another. This provides a desired height and a desired angle to the string trimmer 200 which is mounted advantageously atop the top mounting bracket 6T as described immediately below. This adjustability of the two vertically disposed springs 9f and 9r, so that the height and angle of a transitional bracket 13 (discussed below, and positioned atop the top mounting bracket 6T) may be modified to various conditions, provides for modification of position of the trimmer head 230. As one skilled in the art would appreciate, this provides for adjustability of the frequency with which the bottom of the string trimmer head 230 hits the ground with sufficient force to advance a string feed mechanism that is typically impact driven and positioned on the underside of the trimmer head 230. Also, as depicted in FIGS. 8 and 9, the mounting apparatus 150 with springs 9f and 9r provides for impact shock absorption such as when the string trimmer head 230, during movement of the lawn mower 100 is impacted from below (as shown in FIG. 8, see difference in spring compression and bottom portion of bolt 3b of rear spring 9r showing) or from above (as shown in FIG. 9, see difference in spring compression and bottom portion of bolt 3a of front spring 9f showing). This arrangement also provides for a desired self leveling travel and cutting height for trimmer head 230 between points of impact such as shown in FIGS. 8, 9.

With further reference to FIGS. 1A and 1B, mounting apparatus 150 holding the trimmer 200 comprises an electrical control lever device 28 that is shown mounted on a driving handle 105 of lawn mower 100. The control lever device 28, which may be a simple two-way switch, is provided with electrical power by way of a wire 245 connected to the lawn mower 100 generator system (attached in a manner not shown), and a control wire 246 connects the control lever device 28 to the D.C. motor 26, the rotation of which is controlled by control lever device 28. The electrical control lever device 28 and D.C. motor 26 are components of a trimmer head angle adjustment sub-combination of the mounting apparatus 150. Such sub-combination also comprises a protective clutch mechanism, and one embodiment of a protective clutch mechanism, which is not meant to be limiting, is described as follows. This is more easily viewed in FIG. 3B. The D.C. motor 26 is mounted on an adjustable bracket 25 by fasteners 4b attached on the outward edge of an elongated tube 17. Such arrangement enables the D.C. motor 26 to activate a drive adapter 23, which is attached by a fastener 24 and the protective clutch mechanism embodiment further comprises a bolt 3e and a material washer 14a, clamped under a drive sprocket 20f, and a material washer 14b compressed under a flat washer 7e by an attached adjustable nut 4e, which is adjustable so that the protective clutch mechanism that may slip should the string trimmer head 230 resist movement by the D.C. motor 26, thereby providing a clutched impact mechanism. This slippage is between the surfaces of the material washers 14a and 14b that contact sides of the drive sprocket 20f, and the amount of slippage (and, alternatively, friction to provide for movement of a driven sprocket 20s) is controllable by adjustment of the adjustable nut 4e upon the bolt 3e, which passes between drive adapter 23 and the nut 4e. That is, in that the drive sprocket 20f engages a chain 21 that turns the driven sprocket 20s that is mounted on a first elongated mounting tube 19a (also see FIG. 3A) that comprises a clamping end 30 that clenches an encapsulated section of the tubular drive shaft housing 220 of string trimmer 200 with constricting tabs by fastener comprising a bolt 3f and a matching nut (not viewable in FIG. 1A, see 4f in FIG. 3B), in circumstances in which the string trimmer head 230 is undesirably rotated through collision with an object, so that the tubular drive shaft housing 220 is forced to rotate, and rotates the driven sprocket 20s, there is a slippage between the material washers 14a and 14b and drive sprocket 20f such that the rotation is not fully transferred to the drive adapter 23 and into the motor 26. This protective clutch mechanism, the exact form of which is not meant to be limiting, thereby protects the motor 26 but also, under proper tensioning of the adjustable bolt 4e, provides for sufficient friction between the material washers 14a and 14b and drive sprocket 20f to provide for the motor 26, upon a command from the control lever device 28, to rotate the drive sprocket 20f, which then rotates the driven sprocket 20s, which consequently rotates the tubular drive shaft housing 220, which thusly rotates the trimmer head 230. Such arrangement enables the D.C. motor 26 to adjust a radial angle of the trimmer head 230 while also providing for protection of the motor 26. The arrangement also is adjustable to effectuate a drive mechanism that may slip should the string trimmer head 230 resist movement by the D.C. motor 26. This slip clutched impact mechanism allows slippage thereby protecting the D.C. motor 26 from seizing of the trimmer head 230 due to potential obstruction when actuating rotation of the trimmer, regardless of the nature of the obstruction. More generally, during typical non-obstructed operation, actuation of control lever device 28 provides variable circumferential cutting positions of the operative string trimmer head as shown in (FIGS. 4A-4D).

As further depicted in the embodiment shown in the figures (see, for example, FIGS. 1A and 3A), to a side opposite the mounting tube 19a the driven sprocket 20s rides against a flat washer 7f which on its other side is affixed to the elongated tube 17 that further is affixed to a flat washer 7g. So configured, when driven sprocket 20s is driven by drive sprocket 20f via chain 21, the string trimmer tubular drive shaft housing (i.e., 'shaft') clenched as described herein rotates, but the washer 7f and components affixed to it (e.g., elongated tube 17, flat washer 7f) do not rotate. Contacting and affixed to flat washer 7g on the opposite side from elongated tube 17 is a helical spring 11, which is affixed at its other end to a flat washer 7h. Flat washer 7h is attached to joined elongated mounting tube 19b within which are encompassed minimal friction bushings 18a and 18b that comprise inner surfaces that slidingly engage an installed shaft of a string trimmer such as the tubular drive shaft housing 220 of string trimmer 200. For example, the elongated tubular drive shaft housing 220 of the string trimmer 200 is positioned within the mounting apparatus 150, and may slidably engage friction bushings 18a and 18b either via longitudinal movement, such as during insertion or during a frontal impact (see FIG. 5), or during adjustment of radial angle of the string trimmer head 230 (see FIGS. 4A-4D).

Figure 5:
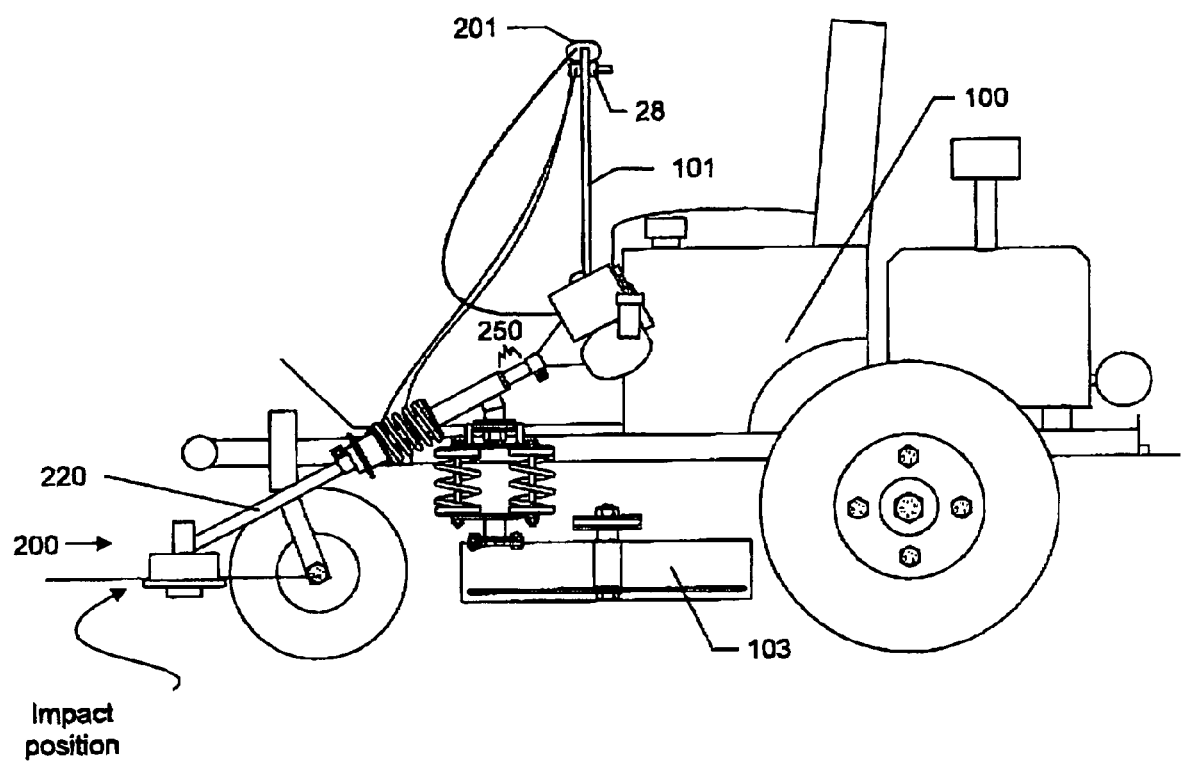
FIG. 5 provides a side plan elevation view showing the present invention integrating the retracted impact position of the string trimmer mounted on a lawn mower.

Further regarding frontal impact, FIG. 5, compared to FIG. 1, reveals that upon an impact that exerts force upward toward the power source of the string trimmer 200 from the trimmer head 230 (i.e., a 'frontal impact' following the direction of the arrow showing "impact position"), the spring 11 compresses and a portion of the elongated tubular drive shaft housing of the string trimmer 200 moves upward through the friction bushings 18a and 18b (see span movement labeled "250").

Figure 6:
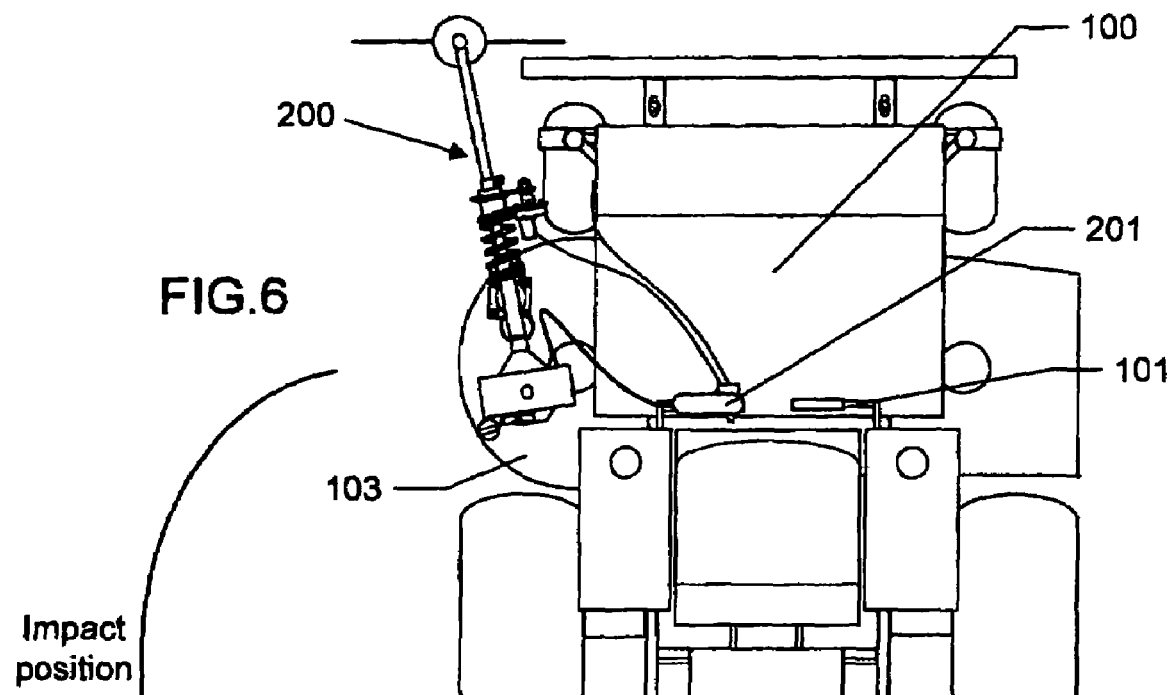
FIG. 6 provides a top plan elevation view showing the present invention integrating the operative position of the string trimmer mounted on a lawn mower. control devices.
Figure 7:
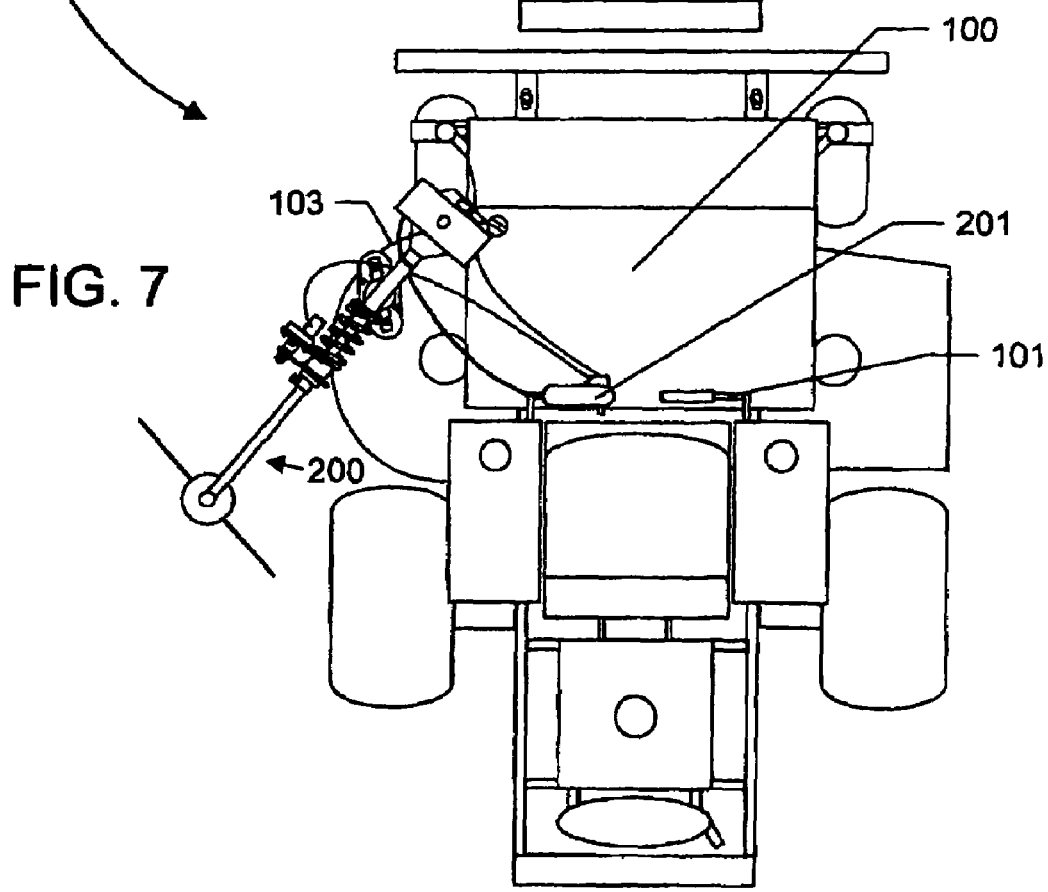
FIG. 7 provides a full top plan elevation view showing the present invention integrating the pivoting axis of the string trimmer released in the impact trailing position mounted on a lawn mower.

Further with regard to the attachment of the string trimmer 200 to the lawn mower 100 by means of the embodiment of the present invention as depicted in FIGS. 1A-1C and 3A, the mounting tube 19b is attached on the top of an elongated tube 16 that is mounted on a corresponding elongated tube 15. Elongated tubes 15 and 16 together provide a desired angle of the mounting tube 19b (and, more generally, the upper impact assembly, see FIG. 3A discussion) in relation to the top mounting bracket 6T (and, more generally, the lower mounting shock assembly 152, see FIG. 3A discussion). Elongated tube 15 sleeves a downwardly extending vertically disposed fastener comprising an affixed bolt 3v that passes through a flat washer 7j and a material washer 14c above the transitional bracket 13, and a nut 4v. In the embodiment depicted, flat washer 7j is rigidly affixed to elongated tube 15 and provides a second bearing surface, further described below. The elongated tubes 15 and 16, formed as shown with flat washer 7j so affixed, comprise one example of what is generally referred to herein as an angled structure (identified as 320 in FIG. 3A, which additionally may be comprised of additional elements). The transitional bracket 13 is elevated from top bracket 6T by two transverse solid brackets 12, and comprises a hole (not shown) through which the shaft (see FIG. 3A) of fastener bolt 3v passes. The transitional bracket 13 also comprises an upper surface against which is compressed the material washer 14c, and a lower surface against which a material washer 14d is compressed under a flat washer 7k by fastener nut 4v. The portions of the upper and the lower surfaces of transitional bracket 13 that contact material washers 14c and 14d are referred to respectively as bearing and frictional surfaces, and with the opposing surfaces of the respective material washers 14c and 14d comprise a slip friction junction that is compressed by adjustment of the fastener nut 4v onto fastener bolt 3v. This arrangement of elements provides an adjustable pivotal axis comprising a slip friction junction shown in operative position on the mower deck 100 in FIG. 6 and in a trailing impact position in (FIG. 7). With adjustment of the fastener 4v by proper tightening, this provides a bearing surface of the upper impact assembly that is disposed to form, at a minimum, an upper part of the slip friction junction that provides for lateral movement upon a trimmer head installed therein receiving a lateral impact. More generally, this may be considered to provide a lateral slip friction swivel junction.

Further to a feature described above associated with FIGS. 8 and 9, the two transverse brackets 12 join the upper surface top mounting bracket 6T, and, as depicted in FIGS. 1A and 3A, are connected to and support transitional bracket 13. On the underside of top mounting bracket 6T are fasteners and retainers that work concurrently to hold the two springs 9f and 9r in place. Spring retainers 8 and flat washers 7 are also below the respective springs and contact the lower mounting bracket 6B. As aforementioned, this arrangement provides the string trimmer 200 self leveling travel over and under impact shown in FIGS. 8, 9. This additionally provides the ability to adjust upward or adjust downward the cutting height. This is done by adjusting a respective adjustable fastener nut 4n on its corresponding fastener bolt 3b for each of the front spring 9f and the rear spring 9r, to achieve a desired height and a desired angle. It is clear from the figures that the height of the trimmer head 230 may also be adjusted by adjusting where the clamping end 30 of elongated tube 19a is tightened along a shaft of a trimmer. Also, in this depicted embodiment said lower mounting bracket 6B is attached on post 5 in a position (i.e., see FIGS. 2, 3A and 6) so that the string trimmer head 230 will cut a path that overlaps the cutting path of the mower blades of lawn mower 100 so that no uncut grass will remain regardless of the operative position of the lawn mower 100.

Figure 3B:
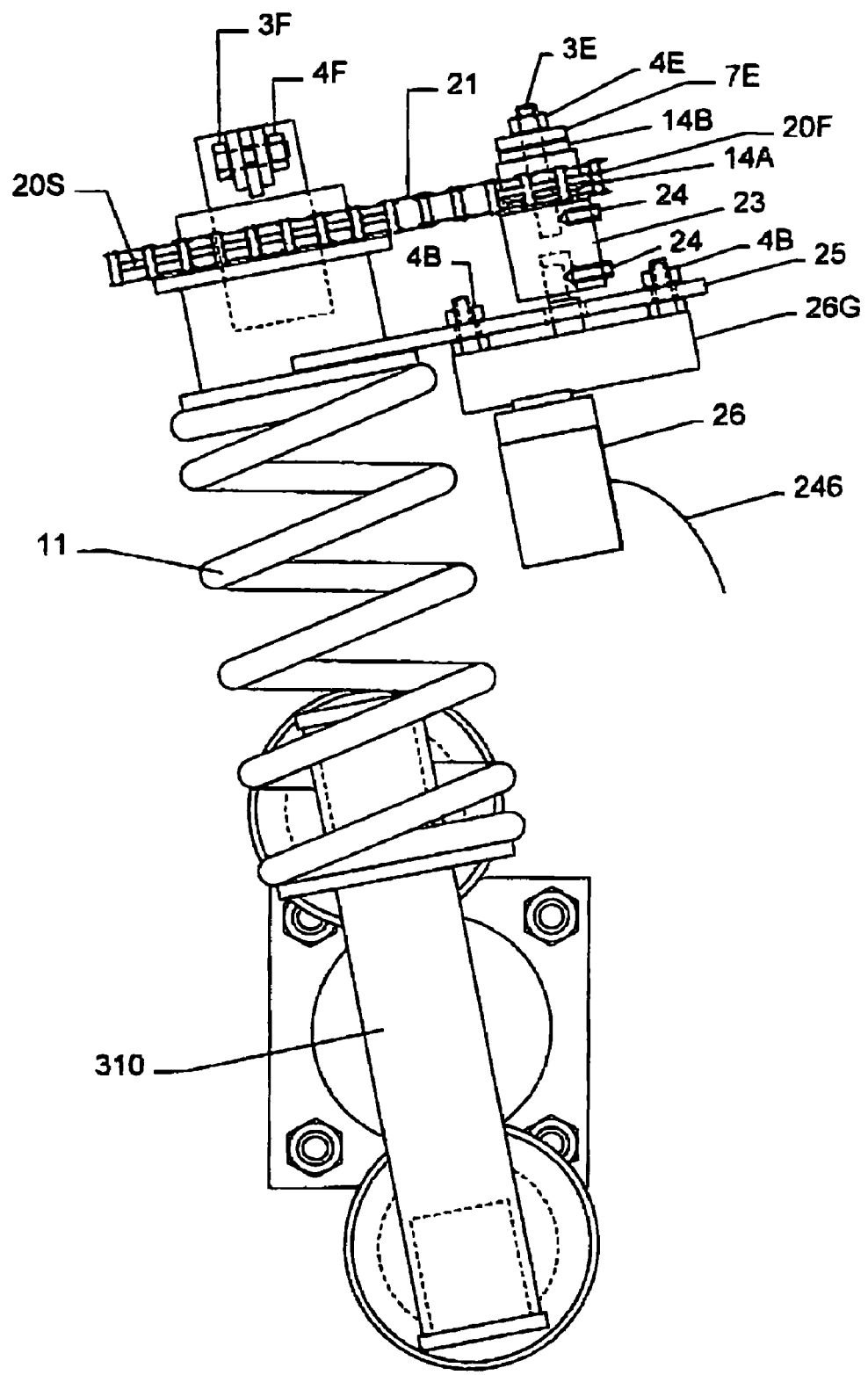
FIG. 3B depicts a top view of the embodiment of the apparatus shown in FIGS. 1A-1C, not mounted on a lawn mower.
Figure 4A:
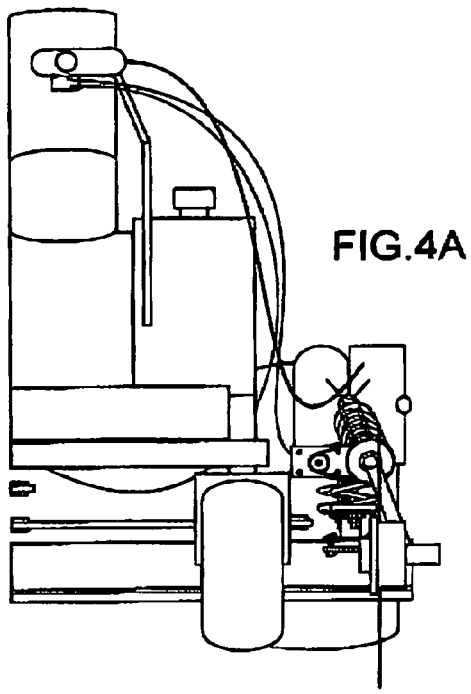
FIG. 4A, FIG. 4B, 4C and FIG. 4D illustrate a number of string trimmer head operative positions attainable with control adjustments of the present invention, depicting these on partial front views of the embodiment of FIGS. 1A-C.
Figure 4B:
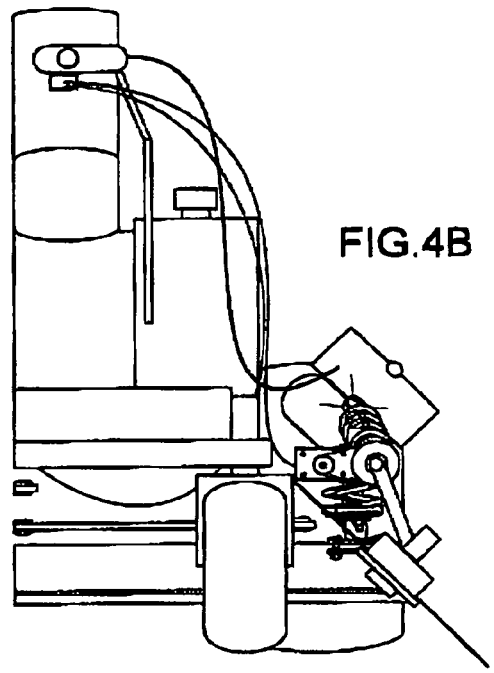
Figure 4C:
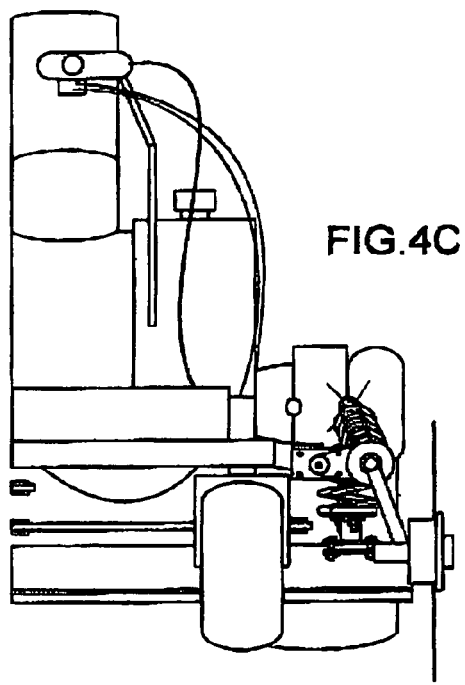
Figure 4D:
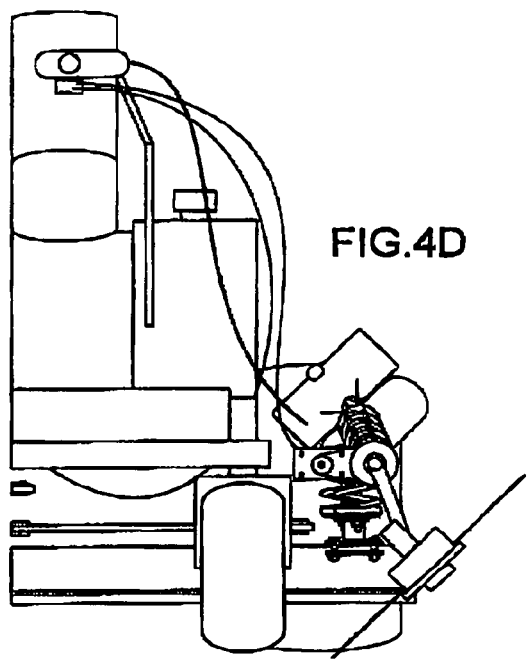

Further viewing FIGS. 3A and 3B, certain aspects of the present invention may be more generally described. FIG. 3A is an enlarged side view of the mounting apparatus 150 depicted in FIG. 1A, and components described for FIGS. 1A-1C are provided with the same identifying numbering in FIG. 3A. FIG. 3B is an enlarged top view of the mounting apparatus 150 depicted in FIG. 1A, without the shaft of the string trimmer, and components described for FIGS. 1A-1C are provided with the same identifying numbering in FIG. 3A. As noted above, the mounting apparatus 150 may be considered to comprise three assemblies or sub-combinations that function in concert. The lower mounting shock assembly 152 is one of the three assemblies or sub-combinations and, inter alia, provides for attachment of the mounting apparatus 150 to a lawn mower (such as lawn mower 100 in FIG. 1A). The lower mounting shock assembly 152 as depicted in FIG. 3A comprises the mounting post 5, the inner mounting bracket 1, the outer mounting bracket 2, the bottom mounting bracket 6B, the top mounting bracket 6T, the front spring 9f and the rear spring 9r, spring retainers 8A-D, each of which has positioned to its exterior side a flat washer 7A-D, two transverse solid brackets 12 that support the transitional bracket 13, and associated fasteners (in particular the two pairs of fastener bolts 3b and fastener nuts 4n connecting the brackets 6A and 6B that also tension and adjust the springs 9f and 9r). Also ascertainable in FIG. 3A is the location of an annular first bearing surface, 302, of a slip friction junction 304 formed where the lower mounting shock assembly 152 connects to the upper impact assembly 154. More specifically for the embodiment of FIG. 3A, the first bearing surface 302 is that surface on the top surface of the transitional bracket 13 that lies beneath material washer 14c. This first bearing surface 302 receives the weight of the upper impact assembly 154 and any trimmer that is installed therein. This first bearing surface 302 is compressed against material washer 14c by the tightening of fastener nut 4v on fastener bolt 3v (both of which are components of the upper impact assembly 154). Also, a friction surface 306 is along the bottom surface of the transitional bracket 13 where material washer 14d is contacted. During operation, when a sufficiently strong lateral force is applied to the string trimmer head (not shown in FIG. 3A, see FIGS. 6 and 7), frictional forces between these surfaces may be overcome by such lateral force (and also the frictional forces between the flat washers 7j and 7k and their respective material washers 14c and 14d may be overcome), which would result in a lateral movement of the string trimmer (and the upper impact assembly 154) by rotation of the angled structure 320 about the transitional bracket 13.

The above summary of the lower mounting shock assembly 152 is not meant to be limiting. For example, a hole may be placed centrally in an upper bracket, between two spaced apart springs (or other suspension/shock absorbing devices, such as shock absorbers) and a friction surface, and slip friction junction, would be formed around such hole. That is, such embodiment would operate without the need for a transitional bracket supported by two transverse solid brackets as is described and depicted above. Also, upper and lower brackets may be provided that comprise recessed seats for springs, so that an embodiment comprising such brackets need not comprise spring retainers nor the associated flat washers. For example, the brackets may be configured to hold the springs without the need for retainers and washers by providing internal diameter retainers that extend a distance into the inner space at the tops and bottoms of the springs. Also, adjustable fasteners may be positioned not within the springs, yet at locations along the brackets so as to provide for adjustment of the springs and for holding together the brackets (e.g., one fastener more forward to a forward spring, and one fastener more rearward to the rear spring). Also, any suitable arrangement for attachment to the lawn mower may be provided, and the scope of the present invention is not limited by the depicted post with inner and outer mounting brackets.

The upper impact assembly 154, which provides for shaft rotation and for compression upon certain frontal impacts to the string trimmer head, comprises components that may be identified more generally than the specific components identified in the discussion pertaining to FIG. 1A-1C. Presently these more general identifiers are associated with the earlier-provided terminology, the latter being a specific embodiment included within the scope of the more general terms. Accordingly, the upper impact assembly 154 comprises a first section 310 adapted to slidably engage the shaft, which in the embodiment of FIG. 1A comprises mounting tube 19b, minimal friction bushings 18a and 18b, flat washer 7h, a vertically disposed fastener (comprised of fastener bolt 3v and fastener nut 4v), and the angled structure 320 (comprised of tubes 15 and 16 and washer 7j, the latter providing a second bearing surface of the slip friction junction identified as 304) to which is affixed the vertically disposed fastener. As viewable in FIG. 3A, the lower end of first section 310 is within the top end of spring 11. A second section 330 of the upper impact assembly 154, as depicted in FIGS. 1A-C and 3A-B, comprises the first elongated mounting tube 19a and the fastener comprising bolt 3f and its matching nut that are adapted to clench a shaft of a string trimmer, flat washers 7f and 7g, and the elongated tube 17. The second section 330 receives a driven linkage from the head angle adjustment sub-combination, to effectuate rotation of the shaft. In FIGS. 1A and 3A this driven linkage is driven sprocket 20s. The upper impact assembly 154 also comprises a spring 11 disposed between and affixed to the first section and the second section, and these components are arranged with respect to one another so that during operation, upon a frontal impact to the string trimmer head, the shaft of the string trimmer slidably engages the first section and the spring reversibly compresses (decompressing when the source of the impact is removed).

The head angle adjustment sub-combination may be considered an arrangement of components that is effective to rotate the string trimmer head to a desired angle. In the embodiment depicted in FIG. 3B, this sub-combination uses a motor as the source of mechanical force that rotates the second section 330. More particularly, the head angle adjustment sub-combination comprises control lever device 28, motor 26 (with gear reduction box 26g), a protective clutch mechanism (such as but not limited to the arrangement as is described above, comprising the material washers 14a and 14b one respective sides of sprocket 20f and adjustable bolt 4e), and a drive train from the motor 26 to the shaft 220 (not part of the sub-combination), namely the drive sprocket 20f, the driven sprocket 20s, and the chain 21 connecting these. It is appreciated that in other embodiments a shaft of a string trimmer may be rotated by attachment of a driven member (i.e., a sprocket, pulley or other member as known to those skilled in the art) directly to a portion of the shaft other than at a second section (such as 330). That is, this aspect of the embodiment depicted in FIGS. 1A-1C and FIG. 3B is not meant to be limiting. Also, the positioning of a control lever device is not meant to be limiting, as this may be located at any desirable location.

Figure 2A:
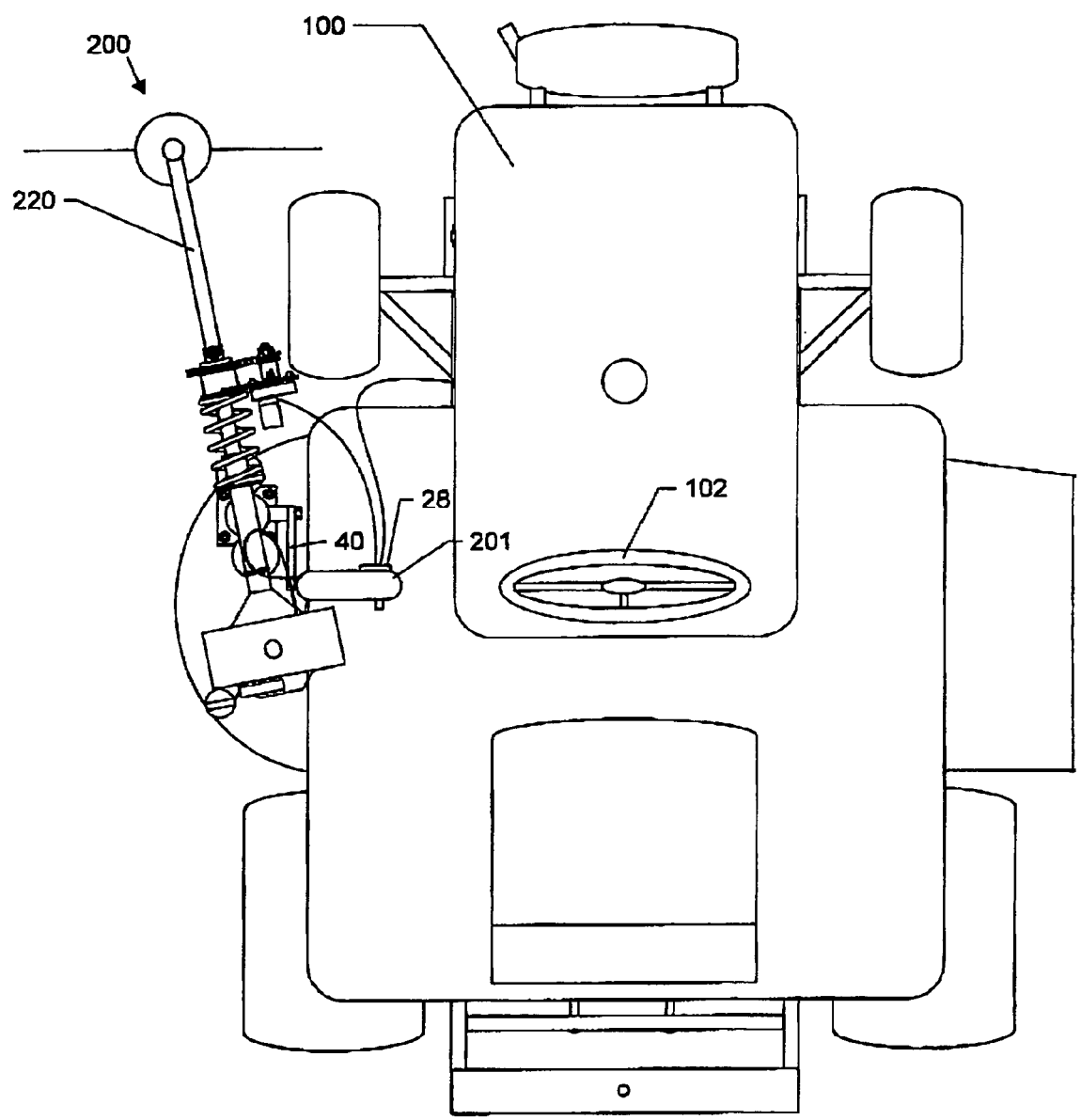
FIG. 2A provides a top plan view depicting an embodiment of the present invention integrating the operatively positioned string trimmer mounted on a lawn mower maneuvered by a steering wheel.
Figure 2B:
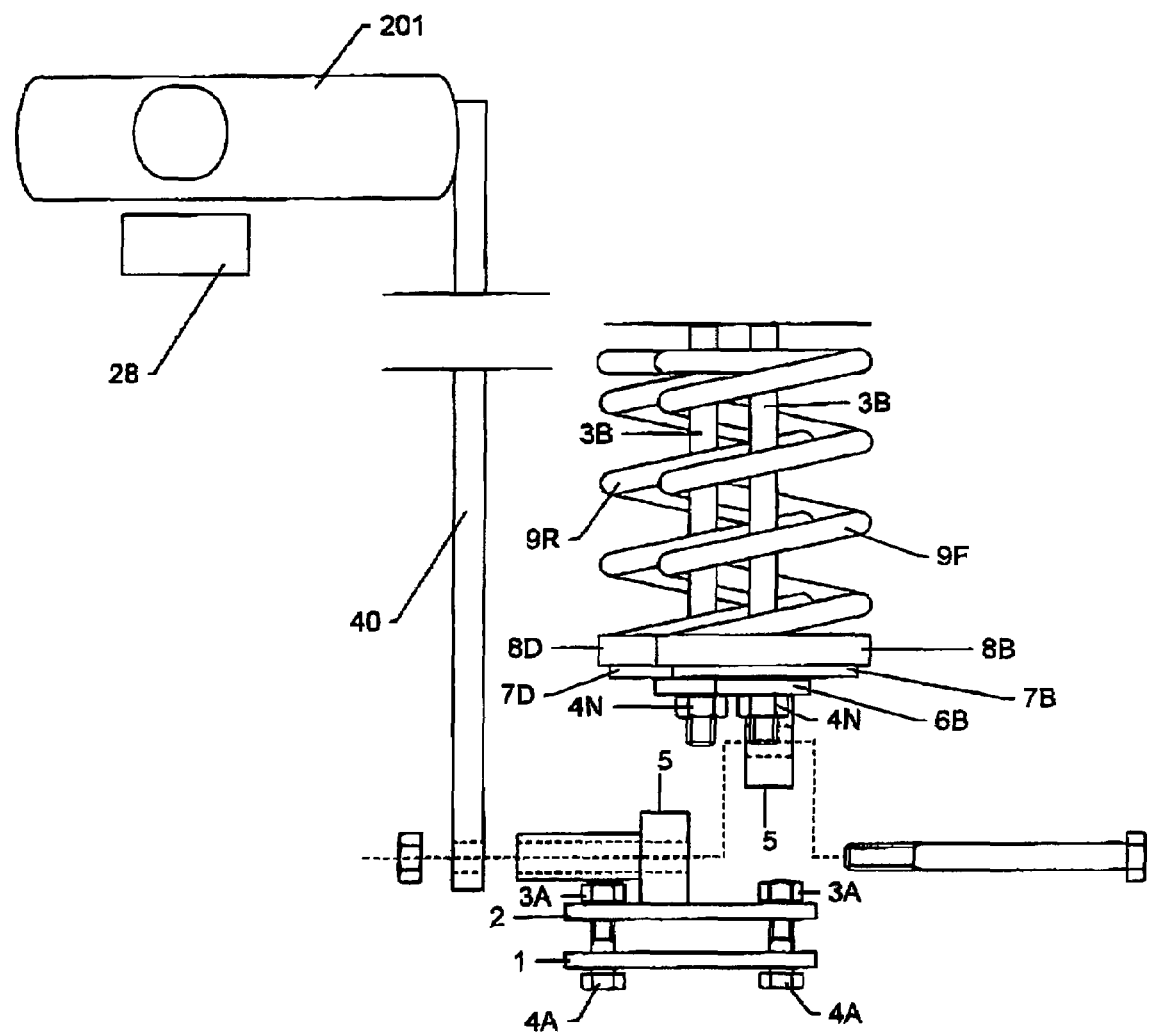
FIG. 2B provides an exploded view of the arrangement of elements in FIG. 2A that support control devices.

Further to the latter, FIG. 2A provides a top plan view depicting an embodiment of the present invention integrating the operatively positioned string trimmer mounted on a lawn mower maneuvered by a steering wheel. FIG. 2B provides an exploded view of the arrangement of elements in FIG. 2A that support a mounting arm 40 atop of which control structures (i.e., control device 201 and control lever device 28) may be attached, with like numbered components corresponding to previously identified components. This example is not meant to be limiting.

Also, it is appreciated that any type of trimmer may be inserted into a mounting apparatus of the present invention. A trimmer need not have an internal combustion gasoline motor at one end of a tubular drive shaft housing. For example, not to be limiting, a trimmer may be powered by an electric motor so positioned, or positioned atop the string trimmer head, or may be powered by a rotating drive shaft from a power take-off of the lawn mower motor. Accordingly, it is more appropriate to consider that the mounting apparatus of the present invention is adapted to slidably engage a "shaft" of a string trimmer, as not all string trimmers which may be positioned by embodiments of the present invention need have a drive shaft through a "tubular drive shaft housing."

Also, it is appreciated that the specific arrangement of components described above that provides a protective clutch mechanism for the D.C. motor is not meant to be limiting. For instance, electrical motors comprising a slippable drive mechanism are known in the art, and may substitute for the separate drive motor and slip clutch to provide a suitable protective clutch mechanism. An example of a small electrical motor that comprises a clutch, or a load control may have internal to their motor housings a stop brake or a coil brake which is referred to in the art as a "clutched electric motor". Also, any suitable type of motor may be used, whether it is powered by alternating or direct current, or is a servomotor.

In one embodiment, every fastener nut is a vinyl lock nut. An alternative embodiment may include one or more mated bearing surfaces that comprise undulations (i.e., crenulations) or edges that provide for initial settings and relocations (such as after an impact) to specific desired positions.

Figure 10:
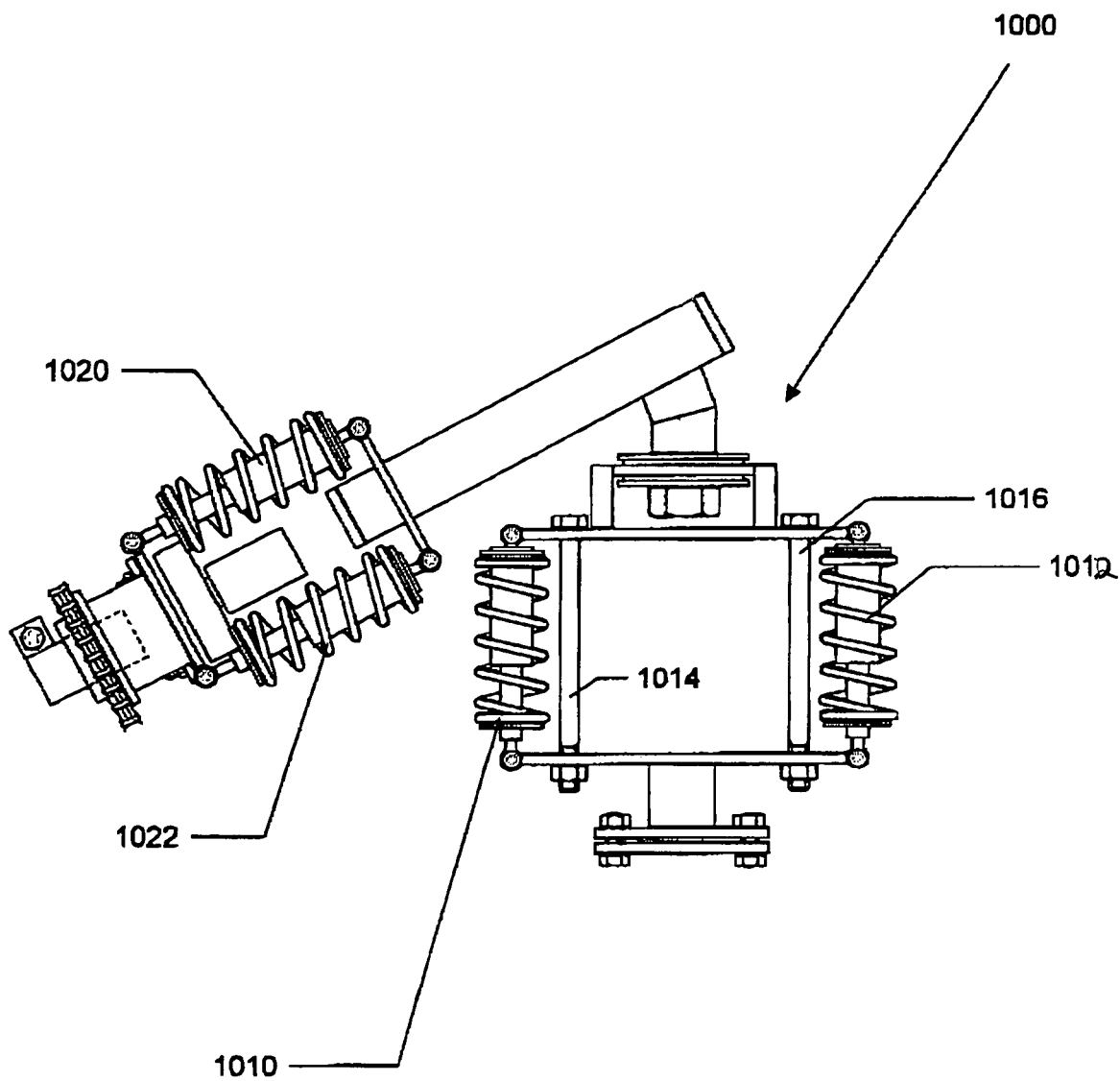
FIG. 10 provides a side view of an alternative embodiment of a mounting apparatus comprising shock absorbers as the suspension/shock absorbing devices.

Also, the springs as disclosed above are one specific type of suspension/shock absorbing devices that may be utilized in the present invention. Any suitable suspension/shock absorbing device may be utilized in place of a helical spring as disclosed above, including a shock absorber with a helical spring, and a leaf-type spring. Generally, a suitable suspension/shock absorbing device has the following characteristics: compressible upon an impact; resistive of the force applied upon the impact; and resilient in that it returns to the original position after cessation of the force of the impact. For example, a forward and a rear shock absorber with helical spring, or a leaf-type spring, may be employed in a lower mounting shock assembly, and the adjustable fasteners may be provided to establish a maximum span of such suspension/shock absorbing devices (such as is done in the above-described embodiment of FIGS. 1A-C for the springs). As another example, instead of the spring of the upper impact assembly, two shock absorbers with helical springs may be positioned on opposite sides of the string trimmer shaft, and connected by a plate or bracket at respective opposite ends to the first section and the second section. FIG. 10 provides a side view of an alternative embodiment of a mounting apparatus comprising shock absorbers as the suspension/shock absorbing devices. In FIG. 10 there is a mounting apparatus 1000 comprising two shock absorbers with helical springs 1010 and 1012 as components of the lower mounting shock assembly, and two shock absorbers with helical springs 1020 and 1022, arranged parallel to one another about a space for a shaft of a string trimmer, as components of the upper impact assembly. Also identified are adjustable fasteners 1014 and 1016 that may be adjusted to provide a desired height of a head of a string trimmer. Other components shown in FIG. 10, apart from these shock absorbers 1010, 1012, 1020, and 1022, correspond to components depicted in FIG. 3A.

It will be readily apparent to those skilled in the art that a variety of modifications, changes and variations to the invention are possible within the spirit and scope of the invention. The invention should not be restricted to the embodiment described and illustrated with references to the drawings. While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A mounting apparatus for mounting onto and controlling a string trimmer on a lawn mower, the string trimmer comprising a string trimmer head affixed at a first end of a shaft, the mounting apparatus comprising:

a. a lower mounting shock assembly, comprising at least one forward vertically disposed spring and at least one rearward vertically disposed spring, each said at least one forward and at least one rearward spring comprising a top end and a bottom end, a top bracket restraining the top ends and a bottom bracket restraining the bottom ends of the at least one forward and the at least one rearward springs, the bottom bracket further adapted to connect to a desired position on said lawn mower, an adjustable fastener adjustably fastening the top bracket with the bottom bracket and providing for height adjustment of each said at least one forward and at least one rearward spring, the lower mounting shock assembly additionally comprising a first bearing surface of a slip friction junction adapted to support a slidably engageable upper impact assembly;

b. the upper impact assembly, comprising a first section adapted to slidably engage the shaft, and from which is provided an angled structure affixed to a vertically disposed fastener and a second bearing surface of the slip friction junction, a second section adapted to clench the shaft between the first section and the trimmer head, and a spring disposed between and affixed to the first section and the second section, wherein during operation upon a frontal impact to the string trimmer head the shaft slidably engages the first section and the spring reversibly compresses, wherein the vertically disposed fastener joins the upper impact assembly with the lower mounting shock assembly, and wherein the slip friction junction tensioned by the vertically disposed fastener is effective to permit movement of said upper impact assembly upon lateral impact to the string trimmer head;

c. a head angle adjustment sub-combination, effective to adjust a radial angle of the string trimmer head, comprising a motor operably connected to the shaft and a control handle comprising a control lever device operably connected to the motor, the sub-combination effective to rotate the string trimmer head upon actuation of the control lever device, wherein the motor comprises or is operably connected to the shaft via a protective clutch mechanism.

2. The mounting apparatus of claim 1, the lower mounting shock assembly additionally comprising a transverse bracket disposed a distance above the top bracket, and two spaced apart transverse brackets contacting the top bracket and supporting the transverse bracket, wherein the first bearing surface is positioned on the transverse bracket.

3. The mounting apparatus of claim 1, wherein the protective clutch mechanism comprises a drive adapter, a first washer positioned between the drive adapter and a first side of a drive sprocket drivingly connected to a driven sprocket for rotation of the shaft, a second washer positioned on a second side of the drive sprocket, and an adjustable fastener comprising a bolt affixed to the drive adapter and passing through the drive sprocket, and a nut adjustable about the bolt at an end opposite the drive adapter, wherein adjustment of the nut provides a varying level of slippage between the first and second washers and the drive sprocket.

4. The mounting apparatus of claim 1, wherein the motor is a clutched electric motor comprising a slippable drive mechanism as the protective clutch mechanism.

5. A mounting apparatus for mounting a string trimmer onto a lawn mower, the string trimmer comprising a string trimmer head and a power source connected by a tubular drive shaft housing, the mounting apparatus comprising:

a. an arrangement of elements for adjusting a radial angle of the string trimmer head comprising a control handle operably connected to a motor, the motor operably connected to the string trimmer tubular drive shaft housing through a drive mechanism, effective to rotate the string trimmer head upon actuation of the control handle;

b. an arrangement of elements for absorbing frontal impact upon the string trimmer head comprising a spring having a first end and a second end, the first end connected to the drive shaft housing, and the second end connected to a mounting apparatus, and c. the mounting apparatus, comprising a forward vertically disposed spring and a rearward vertically disposed spring, each said forward and rearward spring comprising a top and a bottom end, a top bracket restraining the top ends and a bottom bracket restraining the bottom ends of the forward and the rearward springs, an adjustable fastener between the top bracket and the bottom bracket for adjustment of each said forward and rearward spring, and a vertically disposed fastener providing an adjustably pivoting fitting adapted to move upon lateral impact, the bottom bracket further adapted to connect to a desired position on said lawn mower.

6. A mounting apparatus for mounting onto and controlling a string trimmer on a lawn mower, the string trimmer comprising a string trimmer head affixed at a first end of a shaft, the mounting apparatus comprising:

a. a lower mounting shock assembly, comprising at least one forward vertically disposed suspension/shock absorbing device and at least one rearward vertically disposed suspension/shock absorbing device, each said at least one forward and at least one rearward suspension/shock absorbing device comprising a top end and a bottom end, a top bracket joining the top ends and a bottom bracket joining the bottom ends of the at least one forward and the at least one rearward suspension/shock absorbing devices, the bottom bracket further adapted to connect to a desired position on said lawn mower, an adjustable fastener adjustably fastening the top bracket with the bottom bracket and providing for height adjustment of each said at least one forward and at least one rearward suspension/shock absorbing device, the lower mounting shock assembly additionally comprising a first bearing surface of a slip friction junction adapted to support a slidably engageable upper impact assembly;

b. the upper impact assembly, comprising a first section adapted to slidably engage the shaft, and from which is provided an angled structure affixed to a vertically disposed fastener and a second bearing surface of the slip friction junction, a second section adapted to clench the shaft between the first section and the trimmer head, and at least one suspension/shock absorbing device disposed between and affixed to the first section and the second section, wherein during operation upon a frontal impact to the string trimmer head the shaft slidably engages the first section and the at least one suspension/shock absorbing device reversibly compresses, wherein the vertically disposed fastener joins the upper impact assembly with the lower mounting shock assembly, and wherein the slip friction junction tensioned by the vertically disposed fastener is effective to permit movement of said upper impact assembly upon lateral impact to the string trimmer head;

c. a head angle adjustment sub-combination, effective to adjust a radial angle of the stream trimmer head, comprising a motor operably connected to the shaft and a control handle comprising a control lever device operably connected to the motor, the sub-combination effective to rotate the string trimmer head upon actuation of the control lever device, wherein the motor comprises or is operably connected to the shaft via a protective clutch mechanism.

7. The mounting apparatus of claim 6, the lower mounting shock assembly additionally comprising a transverse bracket disposed a distance above the top bracket, and two spaced apart transverse brackets contacting the top bracket and supporting the transverse bracket, wherein the first bearing surface is positioned on the transverse bracket.

8. The mounting apparatus of claim 6, wherein the protective clutch mechanism comprises a drive adapter, a first washer positioned between the drive adapter and a first side of a drive sprocket drivingly connected to a driven sprocket for rotation of the shaft, a second washer positioned on a second side of the drive sprocket, and an adjustable fastener comprising a bolt affixed to the drive adapter and passing through the drive sprocket, and a nut adjustable about the bolt at an end opposite the drive adapter, wherein adjustment of the nut provides a varying level of slippage between the first and second washers and the drive sprocket.

9. The mounting apparatus of claim 6, wherein the motor is a clutched electric motor comprising a slippable drive mechanism as the protective clutch mechanism.

10. The mounting apparatus of claim 6, wherein the at least one forward and the at least one rearward suspension/shock absorbing devices comprise springs.

11. The mounting apparatus of claim 6, wherein the at least one forward and the at least one rearward suspension/shock absorbing devices comprise shock absorbers with helical springs.

12. The mounting apparatus of claim 6, wherein at least one suspension/shock absorbing device disposed between and affixed to the first section and the second section comprise two shock absorbers positioned in parallel.

13. A lawn mower comprising the mounting apparatus of claim 1.

14. The lawn mower of claim 13, additionally comprising the string trimmer positioned in the mounting apparatus.

15. A riding lawn mower comprising the mounting apparatus of claim 1.

16. The riding lawn mower of claim 15, additionally comprising the string trimmer positioned in the mounting apparatus.

17. A lawn mower comprising the mounting apparatus of claim 6.

18. The lawn mower of claim 17, additionally comprising the string trimmer positioned in the mounting apparatus.

19. A riding lawn mower comprising the mounting apparatus of claim 6.

20. The riding lawn mower of claim 19, additionally comprising the string trimmer positioned in the mounting apparatus.

* * * * *